United States Patent [19]

Fujiwara et al.

[11] Patent Number: 4,675,567
[45] Date of Patent: Jun. 23, 1987

[54] ELECTRO-PNEUMATIC PRESSURE CONVERTER

[75] Inventors: Masatoshi Fujiwara, Yokosuka; Masato Kuroda, Fujisawa, both of Japan

[73] Assignee: Yamatake-Honeywell Co. Ltd., Tokyo, Japan

[21] Appl. No.: 913,930

[22] Filed: Oct. 1, 1986

[30] Foreign Application Priority Data

Oct. 3, 1985 [JP] Japan .................. 60-219202

[51] Int. Cl.⁴ .......................... H01L 41/08
[52] U.S. Cl. .................. 310/317; 310/331; 310/332
[58] Field of Search ............ 310/316, 317, 319, 320, 310/330-332

[56] References Cited

U.S. PATENT DOCUMENTS

| | | | |
|---|---|---|---|
| 3,742,492 | 6/1973 | Proctor | 310/316 X |
| 4,047,992 | 9/1977 | Williams et al. | 310/316 X |
| 4,556,815 | 12/1985 | Ohhashi et al. | 310/319 X |
| 4,567,394 | 1/1986 | Frisch | 310/317 X |
| 4,625,139 | 11/1986 | Frisch | 310/332 X |

*Primary Examiner*—Mark O. Budd
*Attorney, Agent, or Firm*—Mitchell J. Halista; Albin Medved

[57] ABSTRACT

An electro-pneumatic pressure converter including a switching valve having at least one plate-like piezoelectric element, which is supported at one end in a cantilever manner inside a sealed chamber and a distal end portion of which moves upon application of a voltage, at least two pressure nozzles which are opened and closed upon displacement of the piezoelectric element, and an output channel extending from the sealed chamber to an external portion; a pilot relay for converting a pneumatic pressure signal from the output channel into a pneumatic pressure signal; a pressure sensor for converting the output pressure signal of the pilot relay into an electrical signal; pulse width modulating means for supplying a pulse-width modulation signal corresponding to a difference between the electrical signal from the pressure sensor and an external input signal to the plate-like piezoelectric element of the switching valve; a power supplycircuit for obtaining a predetermined voltage from the external input voltage to supply a voltage to respective portions of the converter; and means for monitoring the external input voltage and inhibiting an output of the switching valve when the external voltage is decreased below a predetermined value smaller than a normal operating range.

6 Claims, 10 Drawing Figures

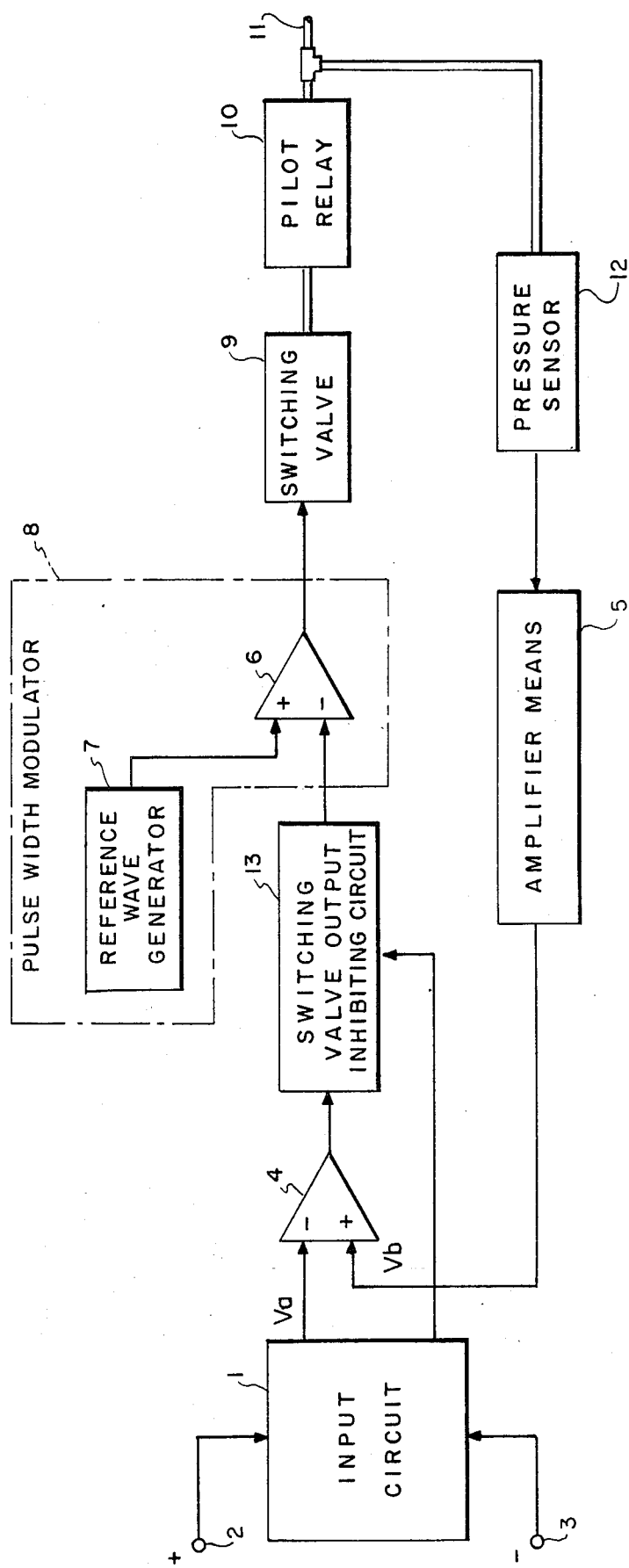
F I G. 1

FIG. 5
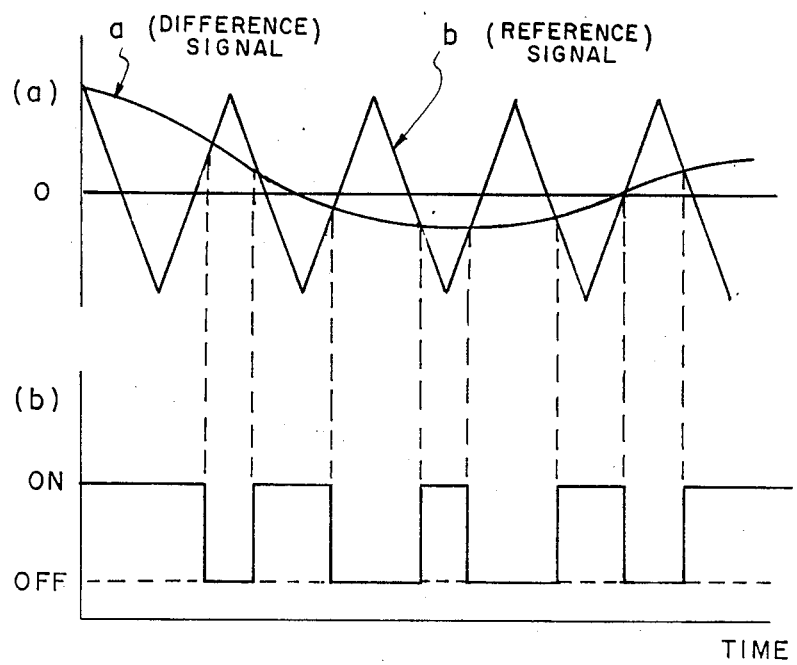
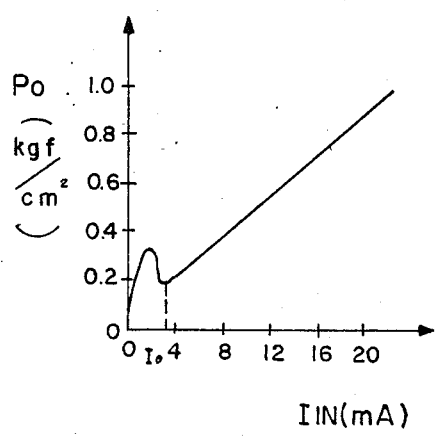
FIG. 6
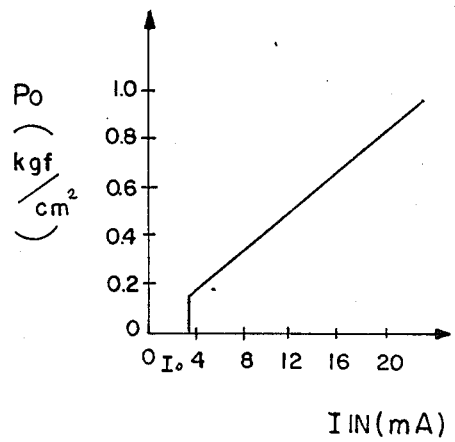
FIG. 7

4,675,567

ELECTRO-PNEUMATIC PRESSURE CONVERTER

BACKGROUND OF THE INVENTION

1. Field of the Invention

The present invention relates to electro-pneumatic converters.

2. Description of the Prior Art

A conventional electro-pneumatic pressure converter converts an electrical input signal to a nozzle back pressure, thereby obtaining a pneumatic pressure signal. For example, a piezoelectric element can be used for a nozzle flapper. The nozzle flapper is arranged to abut against a nozzle port and is shifted in accordance with an electrical input signal, thereby controlling an opening of a gap between the nozzle port and the nozzle flapper and changing the nozzle back pressure. Alternatively, the nozzle flapper can be vibrated at a frequency near a resonance frequency thereof. A ratio of a full-open time to a full-close time for a vibration cycle is controlled in accordance with an electrical input signal utilizing a preselected gap between the nozzle flapper and the nozzle port, thereby also changing a nozzle back pressure. In either converter described above, since an electrical input signal is converted to a nozzle back pressure, it is difficult to obtain a sufficient gain for an input signal. When such an electro-pneumatic pressure converter is operated in a two-wire control system using a signal of 4 to 20 mA, a power supply voltage for the converter must be obtained from the external input signal of 4 to 20 mA. However, if the input voltage is decreased for any reason and a predetermined voltage cannot be obtained, the control of a converter switching valve is impaired, and an abnormal output may be generated.

SUMMARY OF THE INVENTION

An object of the present invention is to provide an improved electro-pneumatic converter.

In accomplishing this and other objects, there has been provided, in accordance with the present invention, an electro-pneumatic pressure converter including a switching valve having at least one plate-like piezoelectric element supported in a cantilever manner inside a sealed chamber with a free end portion of which moves upon an application of a voltage to the element, at least two pressure nozzles which are opened and closed upon a displacement of the free end of the piezoelectric element, and an output channel extending from the sealed chamber to an external portion; means for converting a pneumatic pressure signal from the output channel into a pneumatic pressure signal; a pressure sensor for converting the output pressure signal of the means for converting into an electrical signal; pulse-width modulating means for supplying a pulse-width modulation signal corresponding to a difference between the electrical signal from the pressure sensor and an external input signal to the plate-like piezoelectric element of the switching valve; a power supply circuit for obtaining a predetermined voltage from the external input voltage to supply a power supply voltage to respective portions of the converter; and means for monitoring the external input voltage and inhibiting an output of the switching valve when the external voltage is decreased below a predetermined value.

BRIEF DESCRIPTION OF THE DRAWINGS

A better understanding of the present invention may be had when the following description is read in connection with the accompanying drawings, in which:

FIG. 1 is a block diagram of an example of an electro-pneumatic converter embodying the present invention, FIG. 6 is a diagram illustrating an abnormal operation of an electro-pneumatic converter, FIG. 7 is a diagram illustrating a normal operation of the present invention.

DESCRIPTION OF THE PREFERRED EMBODIMENT

During a normal operation of a basic electro-pneumatic converter, when a pressure nozzle located in a sealed chamber and supplied with a supply pneumatic pressure Ps and another pressure nozzle communicating the interior of the chamber with ambient atmosphere are opened and closed by a plate-like piezoelectric element located in the chamber and controlled by an electrical input signal, a pneumatic pressure in the sealed chamber is changed, and an output pneumatic pressure Po from the chamber is also correspondingly changed. If the electrical input signal is decreased, the output pneumatic pressure Po is also decreased.

Figure 2:
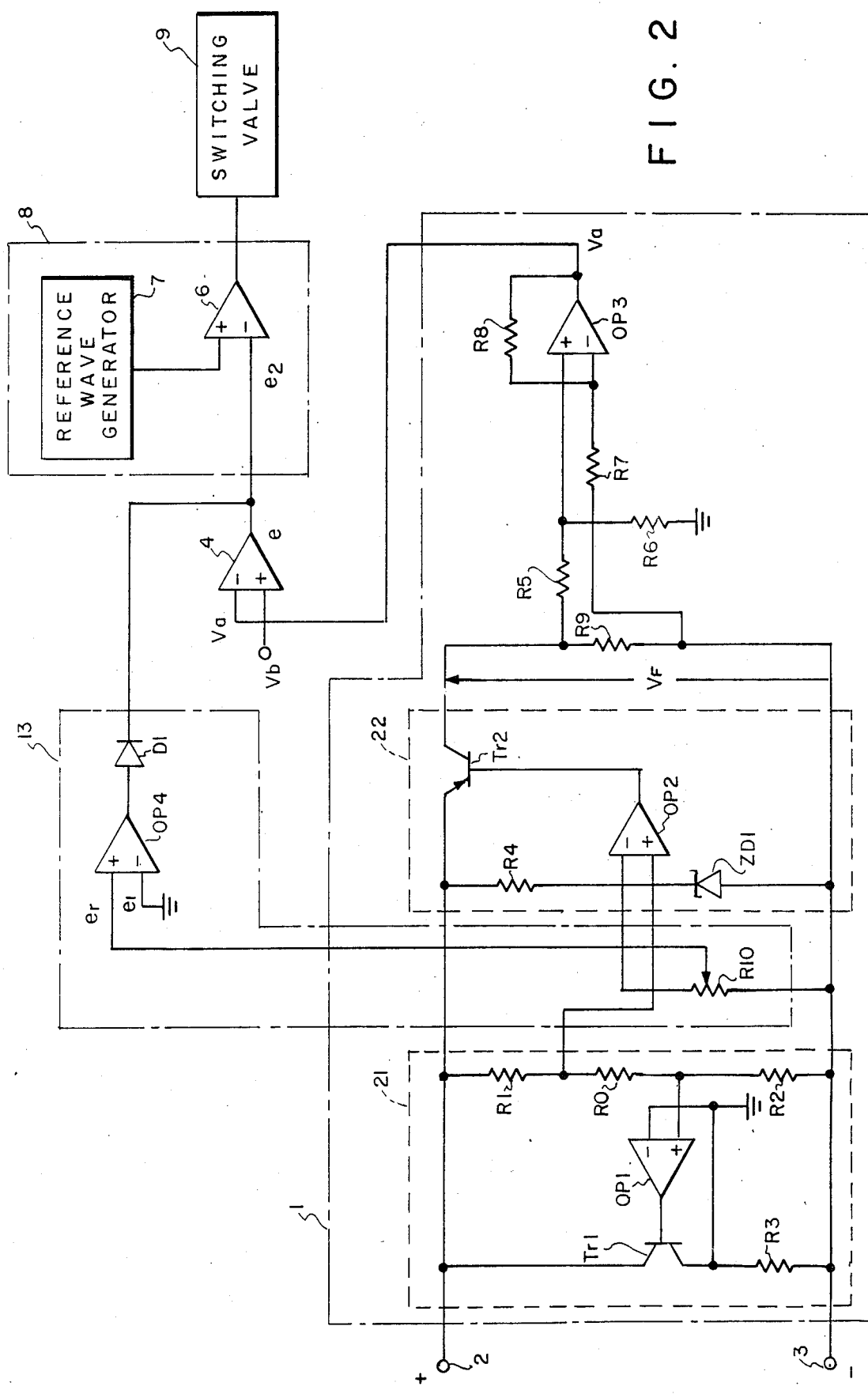
FIG. 2 is a schematic diagram of a portion of the converter shown in FIG. 1.

Referring to FIG. 1, a two-wire input circuit 1 (its detailed arrangement is shown in FIG. 2) receives a current signal within a 4 to 20 mA range from input terminals 2 and 3, converts it into a voltage signal Va, and also serves as a power supply circuit for another circuit. The signal Va is compared by a differential amplifier 4 with an output signal Vb of an amplifier means 5 corresponding to a value obtained by converting an output pneumatic pressure into an electrical signal. More specifically, the differential amplifier 4 produces a difference (Vb−Va) between the two signals. A waveform "a" in FIG. 5(a) shows a difference signal (Vb−Va) corresponding to the output of the differential amplifier 4. The difference signal (Vb−Va) is applied as an input to a comparator 6 forming part of a pulse-width modulator 8, and is compared with as triangular-wave reference signal output from a reference wave generator 7.

Figure 3:
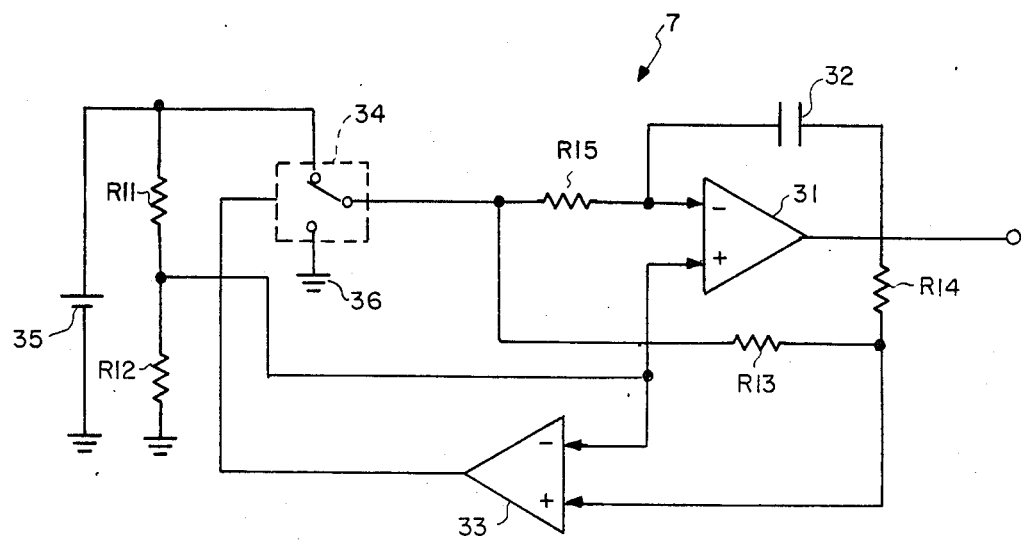
FIG. 3 is a schematic diagram of the reference wave generator portion of the converter shown in FIG. 1.

Referring to FIG. 3, there is shown a detailed schematic for the reference wave generator 7 which used to generate a stable triangular-wave signal. A reference numeral 31 denotes an operational amplifier, which is used to form an integrator together with a feedback capacitor 32. Reference numberal 33 denotes an operational amplifier, which is used to form a comparator; while resistors R1, R12, R13 and R14, constitute a voltage divider; and resistor R15 is an input resistor for the integrator. A switch 34 is controlled by an output signal from the operational amplifier 33 whereby a reference voltage power supply 35 side of the switch 34 and a common terminal 36 side of the switch 34 are switched, i.e., alternately connected, to the inverting input of the operational amplifier 31. With this arrangement, a triangular-wave signal having very stable cycle and amplitude can be obtained. A waveform "b" in FIG. 5(a) shows the triangular-wave reference signal. When the reference signal is higher than the difference signal Vb−Va, the output of the comparator 6 goes "HIGH" (ON); otherwise, goes "LOW" (OFF). More specifically, a pulse-width modulated signal as shown in FIG. 5(b) can be obtained as the output of the comparator 6 as an output from the pulse-width modulator 8.

Figure 4:
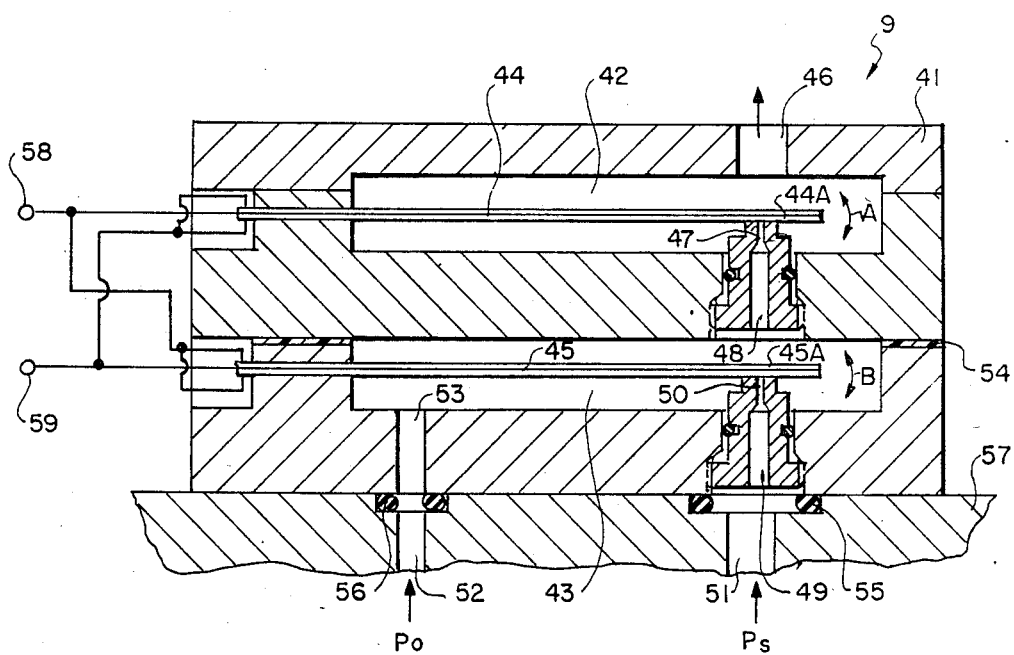
FIG. 4 is a cross-sectional illustration of the switching valve shown in FIG. 1, FIG. 5 a timing diagram illustrating the operation of the converter shown in FIG. 1.

A switching valve 9 controls an airflow in accordance with the output signal from the pulse-width modulator 8, and FIG. 4 shows a detailed arrangement for the valve 9. The switching valve 9 has an air chamber 42 and a sealed chamber 43 located in a housing 41, and bimorph piezoelectric elements 44 and 45 are cantilever-supported inside the chambers 42 and 43, respectively. An air hole 46 is formed in the air chamber 42 to normally communicate the interior of the air chamber 42 with an outer atmosphere. The air chamber 42 and the sealed chamber 43 communicate with each other through a fluid path 48, and a pressure nozzle 47 is defined in the fluid path 48 at the air chamber 42 side. The pressure nozzle 47 is located at a position facing a movable or free end 44A of the bimorph piezoelectric element 44. When the movable end 44A is moved, as indicated by arrow A, the pressure nozzle 47 is opened or closed thereby.

In the sealed chamber 43, a pressure nozzle 50 communicating with a fluid path 49 is formed at a position facing a movable or free end 45A of the bimorph piezoelectric element 45. The pressure nozzle 50 is opened or closed when the movable end 45A is moved, as indicated by arrow B. A fluid path 49 communicates with a pneumatic pressure supply path 51 formed in a fixing section 57, and a supply pneumatic pressure Ps is normally applied thereto. An output channel 53 communicates a pneumatic pressure output path 52 formed in the fixing section 57 with the sealed chamber 43. A reference numeral 54 denotes a gasket for sealing the sealed chamber 43; and reference numbers 55 and 56 indicate O-rings for sealing the housing 41 and the fixing section 57, respectively. The bimorph piezoelectric elements 44 and 45 are driven in opposite directions by a voltage applied to input terminals 58 and 59. More specifically, when the movable end 44A opens the pressure nozzle 47 in accordance with the voltage applied to the input terminals 58 and 59, the movable end 45A closed the pressure nozzle 50. Conversely, when the movable end 44A closes the pressure nozzle 47, the movable end 45A opens the pressure nozzle 50.

In the switching valve 9 using the above arrangement, when the output pulse of the comparator 6 is at "H" level, the nozzle 50 is opened and the nozzle 47 is closed, and the supply pneumatic pressure Ps is applied to the sealed chamber 43, thus turning on the switching valve 9. Conversely, when the output pulse of the comparator 6 is at "L" level, the nozzle 50 is closed, and the nozzle 47 is opened, and the supply pneumatic pressure Ps is interrupted. The air inside the sealed chamber 43 at this time flows into the air chamber 42 communicating with outer atmosphere through the nozzle 47, thus turning off the switching valve 9.

As can be seen from FIG. 5, when the difference signal (Vb−Va) is near zero, the duty ratio of the output pulse of the comparator 6 is 1:1. If the difference signal (Vb−Va) is positive, the "H" interval of the output pulse is prolonged, and if it is negative, the "L" interval thereof is prolonged. Therefore, when an ON/OFF signal shown in FIG. 5(b) is applied from the comparator 6, a pneumatic pressure inside the sealed chamber 43 changes, and an output pressure Po in the pneumatic pressure output path 52 also changes. More specifically, when the difference signal (Vb−Va) is positive, the ON interval of the switching valve 9 is longer than its OFF interval, and the output pneumatic pressure Po from the pneumatic pressure output path 52 increases. In contrast to this, when the difference signal (Vb−Va) is negative, the OFF interval is prolonged, and the output pneumatic pressure Po decreases. Note that the sealed chamber 43 serves as a volume chamber for smoothing the output pneumatic pressure Po, thus eliminating a pulsation caused by the pulse width modulation.

The output pneumatic pressure Po is applied to a pilot relay 10. The pilot relay 10 is a known means for amplifying an input pneumatic pressure signal to convert it into a standard pneumatic pressure signal. The output pressure of the pilot relay 10 is supplied to an output port 11 whereby a pneumatic pressure thereat corresponds to a final output pneumatic pressure. The output of the pilot relay 10 is also detected by a pressure sensor 12, and is converted to an electrical signal which is fed back to the differential amplifier 4 through the amplifier means 5. The feedback signal acts to increase or decrease the difference signal (Vb−Va) toward zero. Upon such feedback control, the stable output pneumatic pressure corresponding to the input signals can be obtained.

However, since the power supply voltage for the respective portions of the converter is obtained from an input current in the two-wire input circuit 1, as described previously, if the input current is decreased below a normal operating range of 4 to 20 mA and the power supply voltage is also decreased below its lower-limit voltage at which the electronic circuits at the respective portions are normally operated, control of the switching valve 9 is impaired. In this state, when an input current $I_{IN}$ is decreased to $I_0$ below 4 mA, e.g., 3.8 mA, Va becomes abnormal, and a correct output can no longer be obtained from the comparator 6. As a result, as shown in FIG. 6, the output from the switching valve 9 becomes abnormal.

In the present invention, when the input signal $I_{IN}$ is decreased below $I_0$, a switching valve output inhibiting circuit 13 is operated, so that the output pneumatic pressure Po of the switching valve 9 is decreased to "0" kgf/cm$^2$. FIG. 2 shows the detailed arrangement of this inhibiting circuit embodiment wherein the input circuit 1 comprises a constant current circuit 21, and a constant voltage circuit 22. The input voltage $I_{IN}$ input to the input terminals 2 and 3 is converted to the voltage signal Va and is used as an input to the differential amplifier 4. In addition, a voltage $V_F$ obtained as the output of the constant voltage circuit 22 is supplied to the respective portions of the converter as the power supply voltage. Note that reference numerals OP1 to OP3 denote operational differential amplifiers; reference numbers R0 and R1 to R9 are resistors; reference characters Tr1 and Tr2, are transistors; and reference ZD1 is a Zener diode.

An output signal obtained by dividing a voltage across the Zener diode ZD1 by the resistor R10 is supplied to the non-inverting input terminal (+) of the differential amplifier OP4. Meanwhile, the inverting input terminal (−) of the differential amplifier OP4 is connected to a common terminal. During a normal operation, if the output point of the resistor R9 is adjusted so that a reference potential "$e_r$" of a comparator consisting of the differential amplifier OP4 is set to be a value slightly lower than a common voltage "$e_1$", the output of the resistor R9 is "0"V, and a diode D1 is reverse-biased. Therefore, the comparator 6 is not influenced by the switching valve output inhibiting circuit 13, and receives the output voltage $Va - Vb$ of the differential amplifier 4 at its inverting input terminal.

However, if the input current is decreased to $I_0$, the power supply voltage supplied from the input circuit 1 cannot be correctly adjusted, and the common potential "$e_1$" is decreased below the reference potential "$e_r$". As a result, the output of the comparator 6 goes to "H" level, an input "$e_2$" of the comparator 6 is decreased regardless of an output "e" ($=Vb-Va$) of the differential amplifier 4, and the output of the comparator 6 goes to "L" level. Thus, the switching valve 9 is in the OFF state, and the output pneumatic pressure Po is decreased to "0" kgf/cm$^2$, as shown in FIG. 7.

Figure 8:
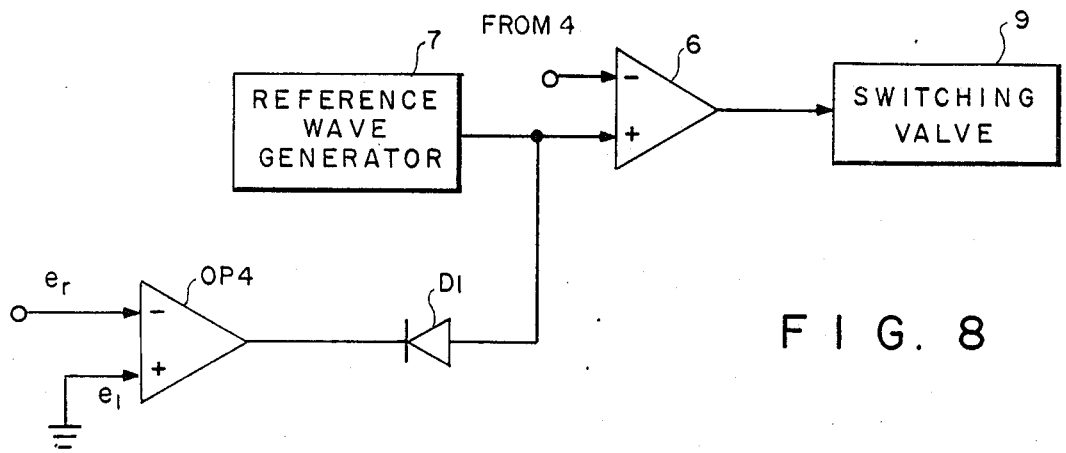
FIG. 8 is a schematic illustration of a first modification of the converter portion shown in FIG. 2.
Figure 9:
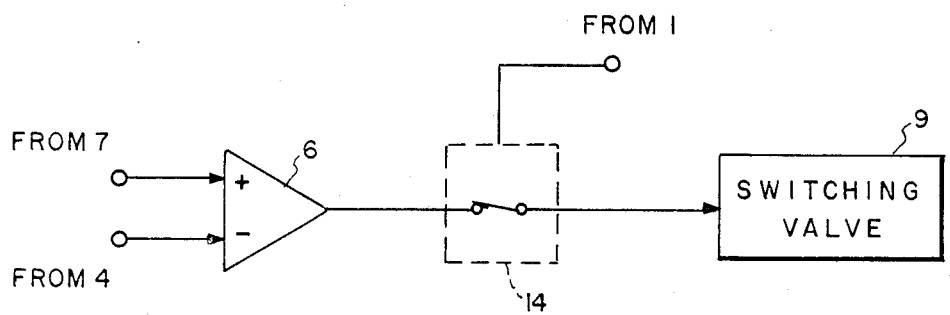
FIG. 9 is a schematic illustration of a second modification of the converter portion shown in FIG. 2
Figure 10:
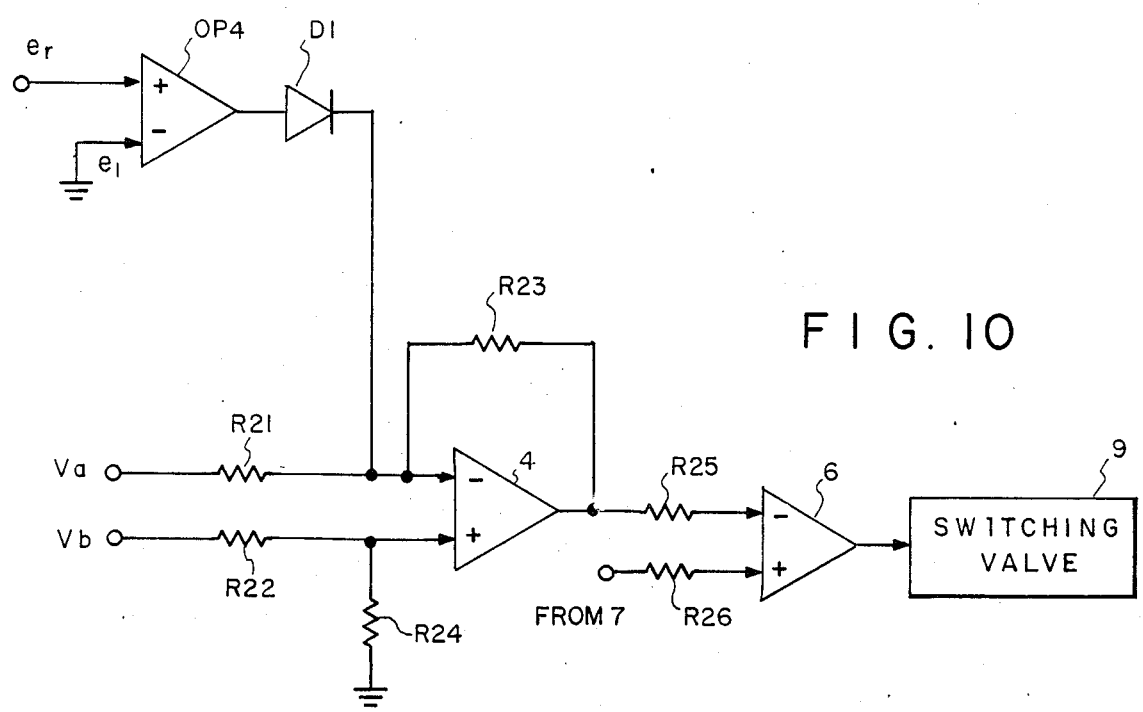
FIG. 10 is a schematic illustration of a third modification of the converter portion shown in FIG. 2.

In the embodiment shown in FIG. 2, the potential of the comparator 6 at the differential amplifier 4 side is fixed. However, the potential of the comparator 6 at the reference-wave generator 7 can be fixed as shown in the embodiment illustrated in FIG. 8. Further, the comparator 6 and the switching valve 9 can be combined through an analog switch 14, as shown in FIG. 9, and when the current $I_{IN}$ is decreased to $I_0$, the switch 14 can be turned off. Alternatively, the input to the differential amplifier 4 can be controlled as shown in FIG. 10. In FIG. 10, the reference numerals R21 to R26 denote resistors.

According to the present invention as described above, since the output pneumatic pressure Po is changed upon an open-close control, by plate-like piezoelectric elements, of a pressure nozzle supplied with the supply pneumatic pressure Ps and another pressure nozzle communicating with outer atmosphere in the switching valve, an electric-pneumatic pressure gain can be greatly improved when compared to an electric-pneumatic pressure conversion method using a nozzle back pressure. In addition, since the plate-like piezoelectric elements are driven by a pulse-width modulation signal, the influence of drift in the piezoelectric elements is very small, and a high-voltage power supply for compensating for the drift is unnecessary. Further, a means for inhibiting the output of the switching valve when an external input signal is decreased below a predetermined value smaller than a normal operating range is provided. Therefore, an abnormal operation when the external input signal is decreased in a two wire type control system which receives its power supply voltage from the external input signal can be prevented.

Accordingly, it may be seen that there has been provided, in accordance with the present invention, an improved electro-pneumatic converter.

The embodiments of the present invention in which an exclusive property or privilege is claimed are defined as follows:

1. An electro-pneumatic converter comprising
   a switching valve having at least one plate-like piezoelectric element means, which is supported at one end in a cantilever manner inside a sealed chamber and a distal end portion of which moves upon application of a voltage, at least two pressure nozzles which are opened and closed upon displacement of the piezoelectric element, and an output channel extending from the sealed chamber to an external portion;
   means for converting a pneumatic pressure signal from the output channel into a pneumatic pressure signal;
   a pressure sensor for converting the output pressure signal from said means into an electrical signal;
   pulse width modulating means for supplying a pulse-width modulation signal corresponding to a difference between the electrical signal from said pressure sensor and an external input signal to the plate-like piezoelectric element means of said switching valve;
   a power supply circuit for obtaining a predetermined voltage from the external input voltage to supply a voltage to respective portions of the converter; and
   means for monitoring the external input voltage and inhibiting an output of said switching valve when the external voltage is below a predetermined value.

2. A converter as set forth in claim 1 wherein said means for converting includes a pilot relay.

3. A converter as set forth in claim 1 wherein said valve includes electrical terminals for connecting to a source of an energizing voltage for applying the energizing voltage across said element.

4. A converter as set forth in claim 1 wherein said element includes a first piezo-electric element having a free end associated with a first one of said nozzles and a second piezo-electric element associated with a second one of said nozzles.

5. A converter as set forth in claim 1 wherein said means for monitoring includes a constant voltage circuit for producing a reference voltage and a comparator for comparing the reference voltage with a predetermined fixed voltage to produce an inhibiting control signal for controlling the operation of said pulse-width modulating means.

6. A converter as set forth in claim 5 wherein said constant voltage circuit includes a Zener diode.

* * * * *